United States Patent
Nagasawa

(10) Patent No.: US 10,664,152 B2
(45) Date of Patent: May 26, 2020

(54) INPUT APPARATUS FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 66 days.

(21) Appl. No.: 15/905,727

(22) Filed: Feb. 26, 2018

(65) Prior Publication Data

US 2018/0284965 A1 Oct. 4, 2018

(30) Foreign Application Priority Data

Mar. 30, 2017 (JP) ................................ 2017-067265
Dec. 12, 2017 (JP) ................................ 2017-237377

(51) Int. Cl.
| | |
|---|---|
| *G06F 3/0488* | (2013.01) |
| *B62D 1/06* | (2006.01) |
| *G06F 3/041* | (2006.01) |
| *G06F 3/0482* | (2013.01) |
| *G06F 3/0484* | (2013.01) |
| *B60K 37/02* | (2006.01) |

(Continued)

(52) U.S. Cl.
CPC ............ *G06F 3/0488* (2013.01); *B60K 35/00* (2013.01); *B60K 37/02* (2013.01); *B62D 1/06* (2013.01); *G06F 3/0236* (2013.01); *G06F 3/041* (2013.01); *G06F 3/0482* (2013.01); *G06F 3/04842* (2013.01); *B60K 2370/126* (2019.05); *B60K 2370/685* (2019.05); *G06F 2203/0339* (2013.01)

(58) Field of Classification Search
CPC ...... G06F 3/0488; G06F 3/0482; G06F 3/041; G06F 3/04842; G06F 3/0236; G06F 2203/0339; B62D 1/06; B60K 35/00; B60K 37/02; B60K 2370/685; B60K 2370/126

See application file for complete search history.

(56) References Cited

U.S. PATENT DOCUMENTS

| | | | | |
|---|---|---|---|---|
| 2005/0021190 | A1* | 1/2005 | Worrell | B60K 35/00 701/1 |
| 2014/0121903 | A1* | 5/2014 | Lee | B60K 35/00 701/41 |
| 2017/0109016 | A1* | 4/2017 | Hachiya | G06F 3/04842 |

FOREIGN PATENT DOCUMENTS

JP 2015-022604 A 2/2015

* cited by examiner

*Primary Examiner* — Yaron Cohen
(74) *Attorney, Agent, or Firm* — McDermott Will & Emery LLP

(57) ABSTRACT

An input apparatus for vehicle includes a display origin displaying unit, a finger detector, an axial position detector, and a display content selector. The axial position detector causes positions of respective fingers of a driver, detected by the finger detector provided on a steering wheel rim in a circumferential direction thereof, to correspond to axial positions in respective first and second directions of axial directions set to a display. The first and second axial directions are respectively set corresponding to first and second directions of directions, starting from a second origin, in the circumferential direction. The second origin is set to the steering wheel rim and corresponds to a first origin displayed on the display. The display content selector selects a content displayed on the display, on the basis of an intersection of the axial positions in the respective axial directions brought into the correspondence by the axial position detector.

13 Claims, 4 Drawing Sheets

(51) Int. Cl.
*B60K 35/00* (2006.01)
*G06F 3/023* (2006.01)

INPUT APPARATUS FOR VEHICLE

CROSS-REFERENCE TO RELATED APPLICATIONS

The present application claims priority from Japanese Patent Application No. 2017-067265 filed on Mar. 30, 2017 and Japanese Patent Application No. 2017-237377 filed on Dec. 12, 2017, the entire contents of both of which are hereby incorporated by reference.

BACKGROUND

The technology relates to an input apparatus for vehicle provided in a vehicle interior. For example, the technology relates to an input apparatus for vehicle that helps to select any content from a plurality of selectable contents that are displayed on a display provided in the vehicle interior.

Some input apparatuses for vehicle cause a plurality of icons directed to a control of a function, such as audio and visual functions, to be displayed on a display of a car navigation system and allow any icon to be selected from the icons. For example, Japanese Unexamined Patent Application Publication (JP-A) No. 2015-22604 discloses an input apparatus for vehicle that allows for a selection of, for example, any application from a plurality of audio and visual applications by touching a corresponding icon displayed on a display of a car navigation system. The display of the car navigation system disclosed in JP-A No. 2015-22604 serves as a touch panel.

SUMMARY

An aspect of the technology provides an input apparatus for vehicle to be mounted on a vehicle. The vehicle is provided with a display and a steering wheel that includes a steering wheel rim. The input apparatus for vehicle is configured to allows a content displayed on the display to be selected on a basis of an intersection of axial positions in respective two axial directions that are set to the display. The input apparatus for vehicle includes: a display origin displaying unit configured to display a first origin on the display, in which the first origin is a point of origin common to the two axial directions; a finger detector that is provided on the steering wheel rim in a circumferential direction of the steering wheel rim, and configured to detect positions of respective fingers of a driver that drives, with the steering wheel, the vehicle; an axial position detector that causes the positions of the respective fingers detected by the finger detector to correspond to an axial position in a first axial direction of the two axial directions and to an axial position in a second axial direction of the two axial directions, in which the first axial direction is set corresponding to a first direction of directions, starting from a second origin, in the circumferential direction of the steering wheel rim, the second axial direction is set corresponding to a second direction of the directions, starting from the second origin, in the circumferential direction of the steering wheel rim, and the second origin is set to the steering wheel rim and corresponds to the first origin displayed by the display origin displaying unit on the display; and a display content selector that selects the content displayed on the display, on a basis of the intersection of the axial positions in the respective two axial directions brought into the correspondence by the axial position detector.

An aspect of the technology provides an input apparatus for vehicle to be mounted on a vehicle. The vehicle is provided with a display and a steering wheel that includes a steering wheel rim. The input apparatus for vehicle is configured to allow a content displayed on the display to be selected on a basis of an intersection of axial positions in respective two axial directions that are set to the display. The input apparatus for vehicle includes: a sensor that is provided on the steering wheel rim in a circumferential direction of the steering wheel rim, and configured to detect positions of respective fingers of a driver that drives, with the steering wheel, the vehicle; and circuitry configured to display a first origin on the display, in which the first origin is a point of origin common to the two axial directions, cause the positions of the respective fingers detected by the sensor to correspond to an axial position in a first axial direction of the two axial directions and to an axial position in a second axial direction of the two axial directions, in which the first axial direction is set corresponding to a first direction of directions, starting from a second origin, in the circumferential direction of the steering wheel rim, the second axial direction is set corresponding to a second direction of the directions, starting from the second origin, in the circumferential direction of the steering wheel rim, and the second origin is set to the steering wheel rim and corresponds to the first origin displayed on the display, and select the content displayed on the display, on a basis of the intersection of the axial positions in the respective two axial directions brought into the correspondence.

DETAILED DESCRIPTION

Figure 1:
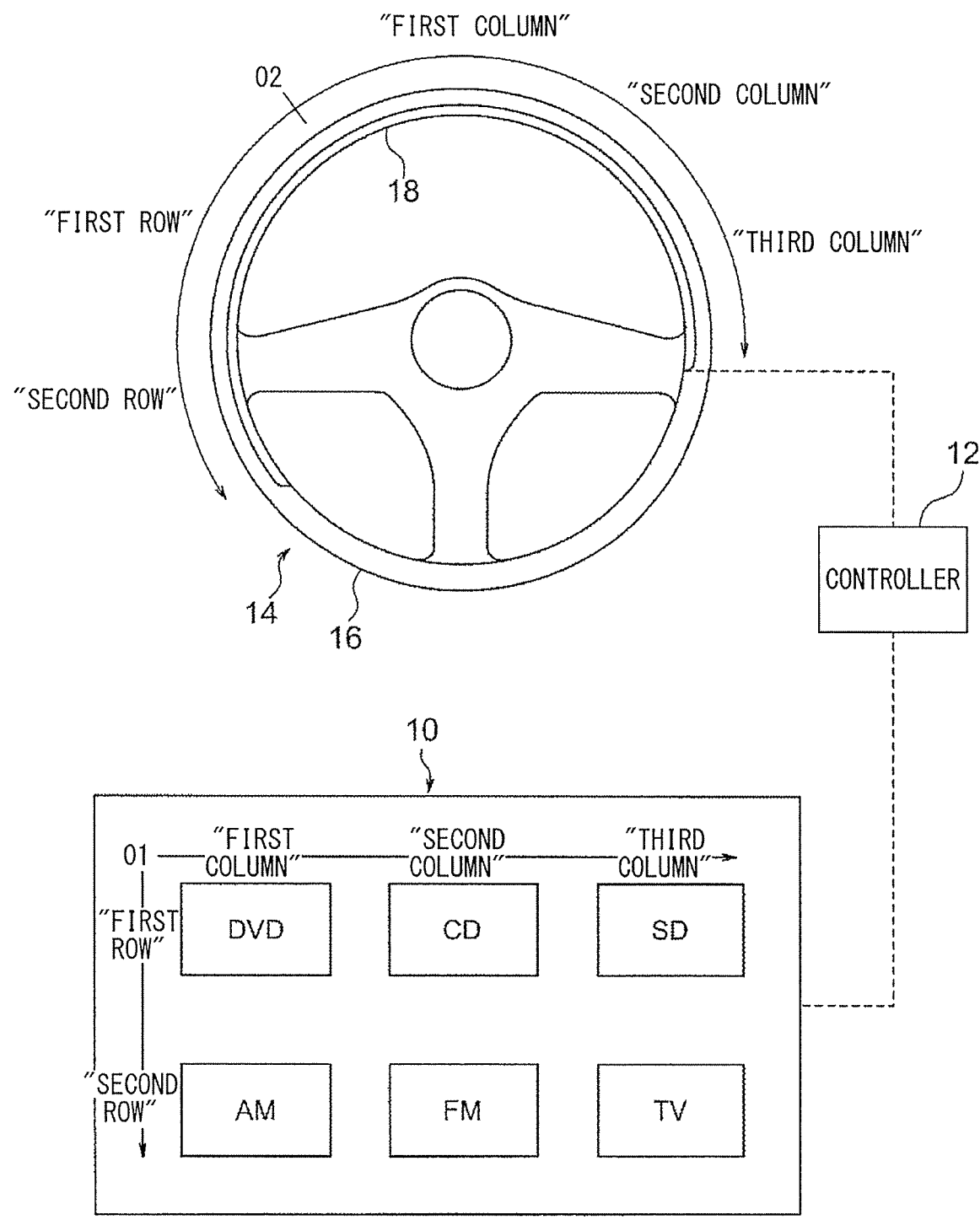
FIG. 1 is a diagram schematically illustrating a configuration of an input apparatus for vehicle according to one implementation of the technology.

In a series of operations including, such as but not limited to, visually confirming icons displayed on a display, making a selection of an icon, touching the display for the selection of the icon, and confirming that the icon is selected, an existing input apparatus for vehicle necessitates a driver of a vehicle to see the icon, i.e., the display, continuously at least during each of those operations. Further, it is necessary for the driver to release a hand from a steering wheel upon touching the display. In other words, the existing input apparatus for vehicle involves a situation that requires the driver to perform together the continuous visual confirmation and the releasing of a hand from the steering wheel, every time the driver makes the selection of an icon.

It is desirable to provide an input apparatus for vehicle that makes it possible to reduce the time required for a driver of a vehicle to move his/her viewpoint as much as possible upon making a selection of a content displayed on a display.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

FIG. 1 schematically illustrates a configuration of an input apparatus for vehicle according to a first implementation of the technology. A vehicle on which the input apparatus for vehicle is to be mounted may be a passenger, vehicle such as, but not limited to, a station wagon. Note, however, that the vehicle on which the input apparatus for vehicle is to be mounted is not limited to the passenger vehicle and may be any vehicle. For example, the vehicle may be provided with a car navigation system that assists driving of the vehicle. The car navigation system may double as the car navigation system and an audio-visual system that performs operations such as, but not limited to, reception, representation, reproduction, and recording of audio and visual as with any car navigation system in recent years. The car navigation system may therefore have a configuration in which selection items of the audio visual system are displayed on a display 10 that displays information such as map information. In an example implementation, the selection item may be displayed in the form of an icon. In an example implementation, the display 10 may be disposed on an instrument panel at a location in front of a center console. Further, the vehicle is provided with a steering wheel 14 that includes a steering wheel rim 16. A driver of the vehicle uses the steering wheel 14 to drive the vehicle.

The car navigation system that also serves as the audio visual system, which hereinafter may be referred to as an "AV navigation", may be provided with a global positioning system (GPS). The GPS may detect a position of the own vehicle. The AV navigation provided with the GPS may be controlled by a controller 12. The controller 12 may be provided in a housing that is substantially the same as a housing of the AV navigation. The controller 12 may include an arithmetic processing unit such as, but not limited to, a microcomputer, and may have advanced processing capability. The controller 12 may therefore have components such as, but not limited to, input and output ports and a storage in addition to an arithmetic processor, as with a computer system. The controller 12 may also perform a mutual communication with any other control unit provided in the vehicle to thereby perform various operations with the control unit mutually, as with any vehicle in recent years. The various operations may include performing of a coordinated control, transfer and reception of information, and sharing of information. In one implementation, the controller 12 may serve as a "display origin displaying unit", an "axial position detector", a "display content selector", and a "steering wheel rim origin displaying unit".

The input apparatus for vehicle according to the first implementation includes a touch sensor 18 that allows the driver to select a content, such as the icon, displayed on the display 10 of the AV navigation. The touch sensor 18 is provided in a circumferential direction of the steering wheel rim 16. In one implementation, the touch sensor 18, or a touch switch, may serve as a "finger detector". The touch sensor 18 may be a resistive touch sensor, a capacitance touch sensor, or any other sensor of a type that allows for a detection of a finger. In any case, the touch sensor 18 is able to detect a position at which any finger of the driver is in contact, or a position pressed by any finger of the driver. For example, the touch sensor 18 is able to detect, individually, positions at which the fingers of the hands of the driver are in contact, or positions pressed by the fingers of the driver. To detect the positions of the respective fingers individually, the touch sensor 18 in an example implementation may be so provided as to extend continuously in the circumferential direction of the steering wheel rim 16. In an alternative example implementation, the touch sensor 18 may have a configuration in which a plurality of electrodes are disposed in the circumferential direction of the steering wheel rim 16.

As described later in greater detail, the touch sensor 18 helps to select a content displayed on the display 10 of the AV navigation, on the basis of an intersection of axial positions in respective two axial directions that are set to the display 10. To select the content on the basis of the intersection of the axial positions, origin O1 is set to the display 10, and origin O2 corresponding to the origin O1 is set to the touch sensor 18, i.e., to the steering wheel rim 16. The origin O1 may be the point of origin common to the two axial directions set to the display 10. In one implementation, the origin O1 may serve as "first origin". In one implementation, the origin O2 may serve as "second origin". One of the two axial directions of the display 10 is set corresponding to one of directions, starting from the origin O2, in the circumferential direction of the steering wheel rim 16. The other of the two axial direction of the display 10 is set corresponding to the other of the directions that are in the circumferential direction of the steering wheel rim 16 which starts from the origin O2. Further, the axial positions in the respective axial directions of the display 10 are defined as the positions, of the touch sensor 18, at which the fingers of the hands of the driver are in contact or pressed thereby. In other words, the axial positions in the respective axial directions of the display 10 are defined as positions at which the right fingers and the left fingers of the driver are in contact or pressed thereby. The touch sensor 18 may be so disposed as to have a length in the circumferential direction of the steering wheel rim 16 which is sufficient to detect the axial positions in the respective axial directions of the display 10.

Figure 2:
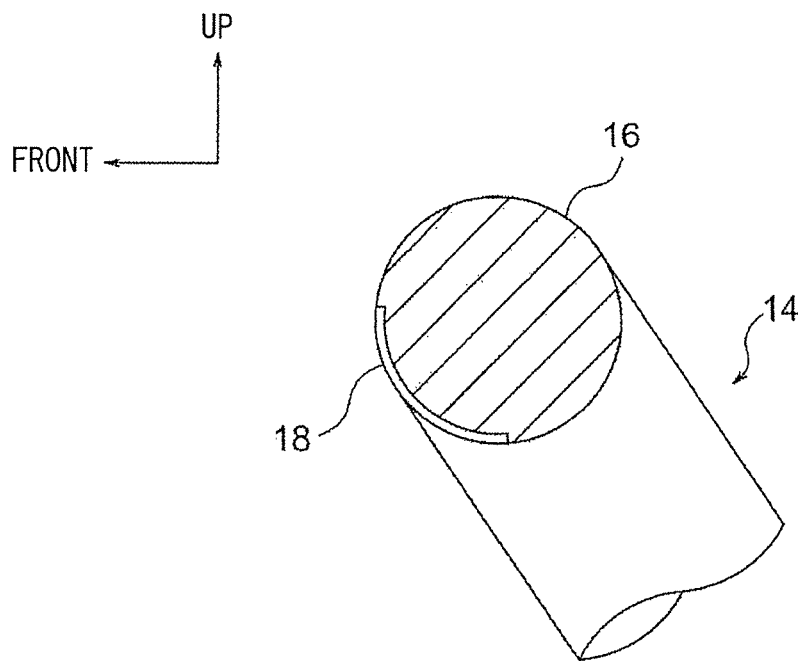
FIG. 2 is a cross-sectional diagram illustrating a touch sensor provided on a steering wheel rim illustrated in FIG. 1.

In an example implementation, the touch sensor 18 directed to the selection of any content displayed on the display 10 may be disposed at a location that is behind the steering wheel rim 16 and on the slightly-inward side of the steering wheel rim 16 as illustrated in FIG. 2. In other words, the touch sensor 18 may be so disposed on the steering wheel rim 16 as to be positioned slightly inwardly in a radial direction of the steering wheel rim 16 on the side opposite to the driver's side. The touch sensor 18 may be disposed at such location of the steering wheel rim 16 in order to prevent the fingers of the driver from coming into contact with or pressing the touch sensor 18 frequently when the driver operates the steering wheel 14. In an example implementation, the touch sensor 18 may be enabled only when a content to be selected is displayed on the display 10. In such an implementation, the touch sensor 18 does not function during much of the time when the driver operates the steering wheel 14 for the driving. Hence, in consideration of such a way in which the touch sensor 18 is used, disposing the touch sensor 18 at any location of the steering wheel rim 16 other than the location described above is acceptable, without much concern, as an example implementation of the technology.

In the first implementation of the technology, a display plane, i.e., the plane, of the display 10 is regarded as a two-axial plane in order to allow the driver to selectively choose a particular content from the contents displayed on the display 10. In other words, in the first implementation, the display plane of the display 10 is regarded as the plane defined by two axes to allow the displayed content corresponding to the intersection of the axial positions in the respective two axial directions to be selected. In an example implementation illustrated in FIG. 1, two axes that are orthogonal to each other, i.e., a horizontal axis and a vertical axis, may be set onto the display 10, and the origin O1 may be set to, for example, an upper left part of the display 10 as the point of origin common to the two axes. To one of the two axes, e.g., the vertical axis, two rows may be set toward the down side from the origin O1, whereas to the other of the two axes, e.g., the horizontal axis, three columns may be set toward the right side from the origin O1, thereby forming a two-by-three matrix. Further, the icons may be disposed at the respective intersections of the corresponding rows and the corresponding columns.

Non-limiting examples of the icons may include "DVD", "CD", "SD", "AM", "FM", and "TV". For example, the axial position in the vertical axis direction and the axial position in the horizontal axis direction of the "CD" icon are respectively at the first row toward the down side from the origin O1 and the second column toward the right side from the origin O1. Hence, the intersection of the axial position in the vertical axis direction and the axial position in the horizontal axis direction is recognized as the "CD" icon. In other words, it is possible to recognize a location (or a position) at which the axial position in the vertical axis direction and the axial position in the horizontal axis direction intersect each other as the "CD" icon. Similarly, for example, the axial position in the vertical axis direction and the axial position in the horizontal axis direction of the "TV" icon are respectively at the second row toward the down side from the origin O1 and the third column toward the right side from the origin O1. Hence, the intersection of the axial position in the vertical axis direction and the axial position in the horizontal axis direction is recognized as the "TV" icon. In the first implementation, the axial positions in the horizontal axis direction may be represented in horizontal axis coordinates, and the axial positions in the vertical axis direction may be represented in vertical axis coordinates. The intersection of the axial positions of the respective vertical and horizontal axes may be represented directly by the vertical axis coordinate and the horizontal axis coordinate in accordance with the definition of coordinates. It is to be noted that the icon is not limited to characters. In an example implementation, the icon may be illustration, symbol, or any other factor that allows for selection as an icon.

As described previously, the touch sensor 18 may be disposed on the steering wheel rim 16 in the circumferential direction of the steering wheel rim 16. The origin O2 may be set corresponding to the origin O1 set to the display 10, at an upper left part of the steering wheel rim 16, where the steering wheel 14 is in a neutral state. Hence, the origin O2 set to the steering wheel rim 16 may be located at a position that is substantially in the same direction as the origin O1 set to the display 10, e.g., in an upper left direction in an example implementation. Setting the origin O2 to the touch sensor 18 is equivalent to setting that origin O2 to the steering wheel rim 16. Further, a horizontal axis direction of the touch sensor 18 corresponding to the horizontal axis direction of the display 10 may be set to one of the directions, in the circumferential direction, of the steering wheel rim 16 which starts from the origin O2 that is set to the steering wheel rim 16. In an example implementation, the horizontal axis direction of the touch sensor 18 corresponding to the horizontal axis direction of the display 10 may be set rightward in the circumferential direction, e.g., in a clockwise direction, from the origin O2 set to the steering wheel rim 16. In addition, a vertical axis direction of the touch sensor 18 corresponding to the vertical axis direction of the display 10 may be set to the other of the directions, in the circumferential direction, of the steering wheel rim 16 which starts from the origin O2 that is set to the steering wheel rim 16. In an example implementation, the vertical axis direction of the touch sensor 18 corresponding to the vertical axis direction of the display 10 may be set leftward in the circumferential direction, e.g., in a counterclockwise direction, from the origin O2 set to the steering wheel rim 16.

Accordingly, to rephrase the foregoing by associating the contents displayed on the display 10 illustrated in FIG. 1 with the steering wheel 14, the rows of the matrix may be set in the counterclockwise direction from the origin O2 set to the steering wheel rim 16 in order of the first row and the second row, and the columns of the matrix may be set in the clockwise direction from the origin O2 in order of the first column, the second column, and so forth. In the display 10, the axial positions in the vertical axis direction may be represented in the vertical axis coordinates and the axial positions in the horizontal axis direction may be represented in the horizontal axis coordinates as described above. Thus, the position in the counterclockwise direction from the origin O2 set to the steering wheel rim 16, at which a finger of the driver is in contact or pressed thereby in terms of the display 10 (normally, a left hand finger), may be calculated, in the form of the vertical axis coordinate, from a detection signal obtained from the touch sensor 18. In addition, the position in the clockwise direction from the origin O2 set to the steering wheel rim 16, at which a finger of the driver is in contact or pressed thereby in terms of the display 10 (normally, a right hand finger), may be calculated, in the form of the horizontal axis coordinate, from a detection signal obtained from the touch sensor 18.

Figure 3:
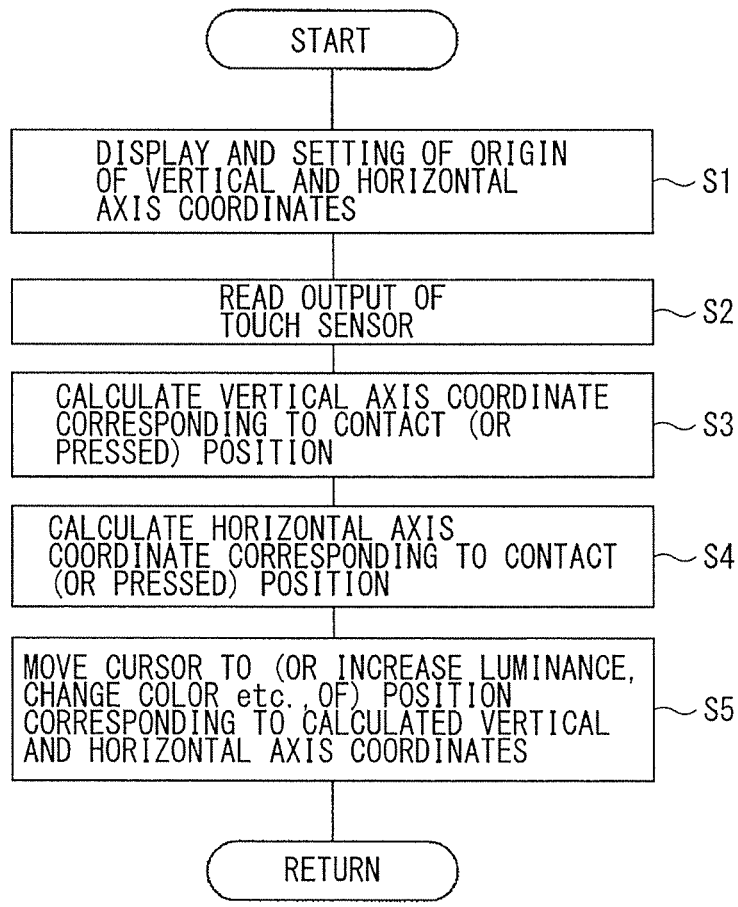
FIG. 3 is a flowchart illustrating an example of a flow of calculation processing performed by a controller illustrated in FIG. 1.

FIG. 3 is a flowchart illustrating an example of a flow of calculation processing performed by the controller 12, in order to allow for the selection of contents displayed on the display 10 on the basis of the positions of the fingers of the driver's hands which are in contact with or press the circumference of the steering wheel rim 16. The calculation processing in an example implementation may be performed as interrupt processing for each predetermined sampling time. First, in step S1, the controller 12 may display the origin O1 on the display and set the origin O2 to the steering wheel rim 16. The origin O1 and the origin O2 serve as the points of origin of the vertical and the horizontal axis coordinates upon the selection of the displayed content. Note that step S1 may be eliminated in an example implementation where the displaying of the origin O1 and the setting of the origin O2 are performed in advance individually by separate schemes.

Thereafter, the flow may proceed to step S2 in which the controller 12 may read the detection signal outputted from the touch sensor 18.

Thereafter, the flow may proceed to step S3. In step S3, the controller 12 may calculate, on the basis of the detection signal of the touch sensor 18 read in step S2, the vertical axis coordinate that corresponds to the position on the steering wheel rim 16 at which a finger of the driver is in contact or pressed thereby (normally, a left hand finger).

Thereafter, the flow may proceed to step S4. In step S4, the controller 12 may calculate, on the basis of the detection signal of the touch sensor 18 read in step S2, the horizontal axis coordinate that corresponds to the position on the steering wheel rim 16 at which a finger of the driver is in contact or pressed thereby (normally, a right hand finger).

Thereafter, the flow may proceed to step S5. In step S5, the controller 12 may move, on the display 10, a cursor to a position that corresponds to the vertical and the horizontal axis coordinates calculated respectively in steps S3 and S4, and may select the display content that corresponds to that position. In the following, the position corresponding to the vertical and the horizontal axis coordinates may be referred to as a "corresponding position". The controller 12 may cause the flow to return after performing step S5. Upon the selection of the displayed content, luminance of the corresponding position may be increased in an example implementation. In an alternative example implementation, a color of the corresponding position may be changed upon the selection of the displayed content.

In the foregoing exemplary calculation processing, the controller 12 may calculate the vertical axis coordinate that corresponds to the position at which a finger of the driver is in contact or pressed thereby (normally, a left hand finger) and the horizontal axis coordinate that corresponds to the position at which a finger of the driver is in contact or pressed thereby (normally, a right hand finger), on the basis of the detection signal obtained from the touch sensor 18 provided on the steering wheel rim 16 in the circumferential direction of the steering wheel rim 16. The vertical axis coordinate and the horizontal axis coordinate directly represent a position on the display 10 as described above, making it possible to select the displayed content located at the corresponding position through moving the cursor to the corresponding position, increasing the luminance of the corresponding position, changing the color of the corresponding position, or performing any other action that shows that the displayed content at the corresponding position is selected. As a result, it is possible for the driver to select any content displayed on the display 10 without releasing a hand from the steering wheel 14. This also helps the driver to select any content displayed on the display 10 intuitively through the driver's operation of adjusting the positions of the fingers of the hands which come into contact with or press the steering wheel rim 16 when the driver is accustomed to such a way of selecting the display content according to some implementations. Hence, it is possible to reduce the time during which the driver continuously sees the display 10.

Note that any existing method may be employed to decide the selection of the content displayed on the display 10 made in accordance with the first implementation. In an example implementation, the driver may double-tap the touch sensor 18 to decide the selection. In an alternative implementation, the driver may double-tap the touch sensor 18 at a position of the origin O2 set on the steering wheel rim 16 to decide the selection.

Figure 4:
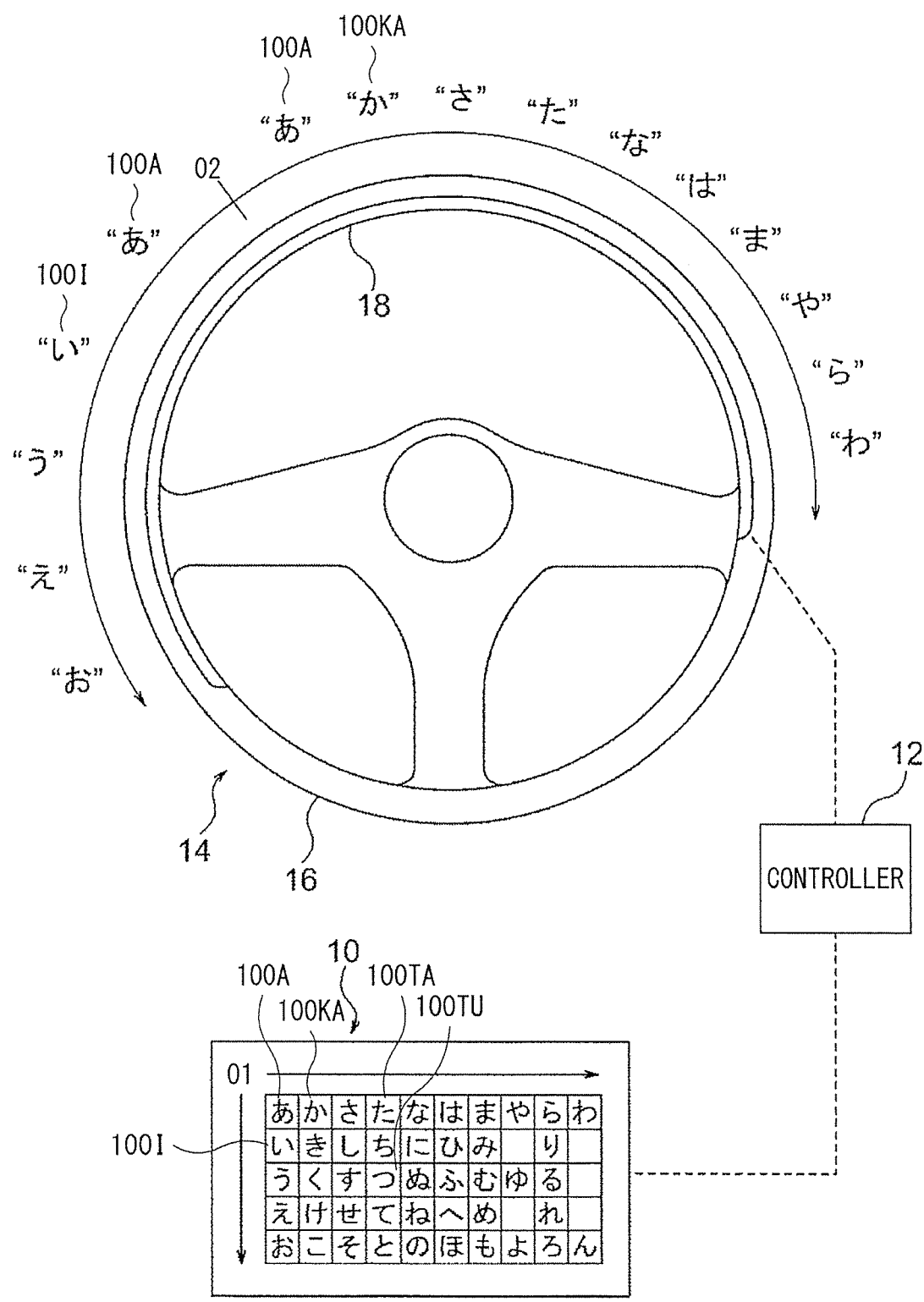
FIG. 4 is a diagram schematically illustrating a configuration of the input apparatus for vehicle according to one implementation of the technology.

A description is given next of the input apparatus for vehicle according to a second implementation of the technology. FIG. 4 schematically illustrates a configuration of the input apparatus for vehicle according to the second implementation. Note that the same or equivalent elements as those of the first implementation described above are denoted with the same reference numerals, and will not be described in detail.

In the second implementation illustrated in FIG. 4, the two axes that are orthogonal to each other, i.e., the horizontal axis and the vertical axis, may be set onto the display 10, and the origin O1 may be set to, for example, the upper left part of the display 10 as the point of origin common to the two axes. To one of the two axes, e.g., the vertical axis, rows of characters may be set toward the down side from the origin O1 in order of a row of characters starting from a character denoted by 100A, a row of characters starting from a character denoted by 100I, and so forth. To the other of the two axes, e.g., the horizontal axis, columns of characters may be set toward the right side from the origin O1 in order of a column of characters starting from the character denoted by 100A, a column of characters starting from a character denoted by 100KA, and so forth. For example, the axial position in the vertical axis direction and the axial position in the horizontal axis direction of a character denoted by 100TU are respectively at the third row toward the down side from the origin O1 and the fourth column toward the right side from the origin O1. Hence, the intersection of the axial position in the vertical axis direction and the axial position in the horizontal axis direction is recognized as the character denoted by 100TU. In other words, it is possible to recognize a location (or a position) at which the axial position in the vertical axis direction and the axial position in the horizontal axis direction intersect each other as the character denoted by 100TU. In the second implementation, the axial positions in the horizontal axis direction may be represented in the horizontal axis coordinates and the axial positions in the vertical axis direction may be represented in the vertical axis coordinates as with the first implementation. The intersection of the axial positions of the respective vertical and horizontal axes may be represented directly by the vertical axis coordinate and the horizontal axis coordinate in accordance with the definition of coordinates.

As with the first implementation, the touch sensor 18 may be disposed on the steering wheel rim 16 in the circumferential direction of the steering wheel rim 16 in the second implementation. The origin O2 may be set corresponding to the origin O1 set to the display 10, at the upper left part of the steering wheel rim 16, where the steering wheel 14 is in the neutral state. Hence, the origin O2 set to the steering wheel rim 16 may be located at the position that is substantially in the same direction as the origin O1 set to the display 10, e.g., in the upper left direction in an example implementation. Setting the origin O2 to the touch sensor 18 is equivalent to setting that origin O2 to the steering wheel rim 16. Further, the horizontal axis direction of the touch sensor 18 corresponding to the horizontal axis direction of the display 10 may be set to one of the directions (for example, may be set rightward in the circumferential direction, e.g., in the clockwise direction), in the circumferential direction, of the steering wheel rim 16 which starts from the origin O2 that is set to the steering wheel rim 16. In addition, the vertical axis direction of the touch sensor 18 corresponding to the vertical axis direction of the display 10 may be set to the other of the directions (for example, may be set leftward in the circumferential direction, e.g., in the counterclockwise direction), in the circumferential direction, of the steering wheel rim 16 which starts from the origin O2 that is set to the steering wheel rim 16.

Accordingly, to rephrase the foregoing by associating the contents displayed on the display 10 illustrated in FIG. 4 with the steering wheel 14, the rows of characters may be set in the counterclockwise direction from the origin O2 set to the steering wheel rim 16 in the order of the row of characters starting from the character denoted by 100A, the row of characters starting from the character denoted by 100I, and so forth. Further, the columns of characters may be set in the clockwise direction from the origin O2 in the order of the column of characters starting from the character denoted by 100A, the column of characters starting from the character denoted by 100KA, and so forth. In the display 10, the axial positions in the vertical axis direction may be represented in the vertical axis coordinates and the axial positions in the horizontal axis direction may be represented in the horizontal axis coordinates as with the first implementation. Thus, the position in the counterclockwise direction from the origin O2 set to the steering wheel rim 16, at which a finger of the driver is in contact or pressed thereby in terms of the steering wheel rim 16 (normally, a left hand finger), may be calculated, in the form of the vertical axis coordinate, from the detection signal obtained from the touch sensor 18. In addition, the position in the clockwise direction from the origin O2 set to the steering wheel rim 16, at which a finger of the driver is in contact or pressed thereby in terms of the steering wheel rim 16 (normally, a right hand finger), may be calculated, in the form of the horizontal axis coordinate, from the detection signal obtained from the touch sensor 18. Hence, as with the first implementation, it is possible to select a displayed content corresponding to a position defined by the vertical and the horizontal axis coordinates calculated from the detection signal obtained by the touch sensor 18, through performing the exemplary calculation processing illustrated in FIG. 3. In other words, it is possible to select a character corresponding to a position defined by the vertical and the horizontal axis coordinates.

Figure 5:
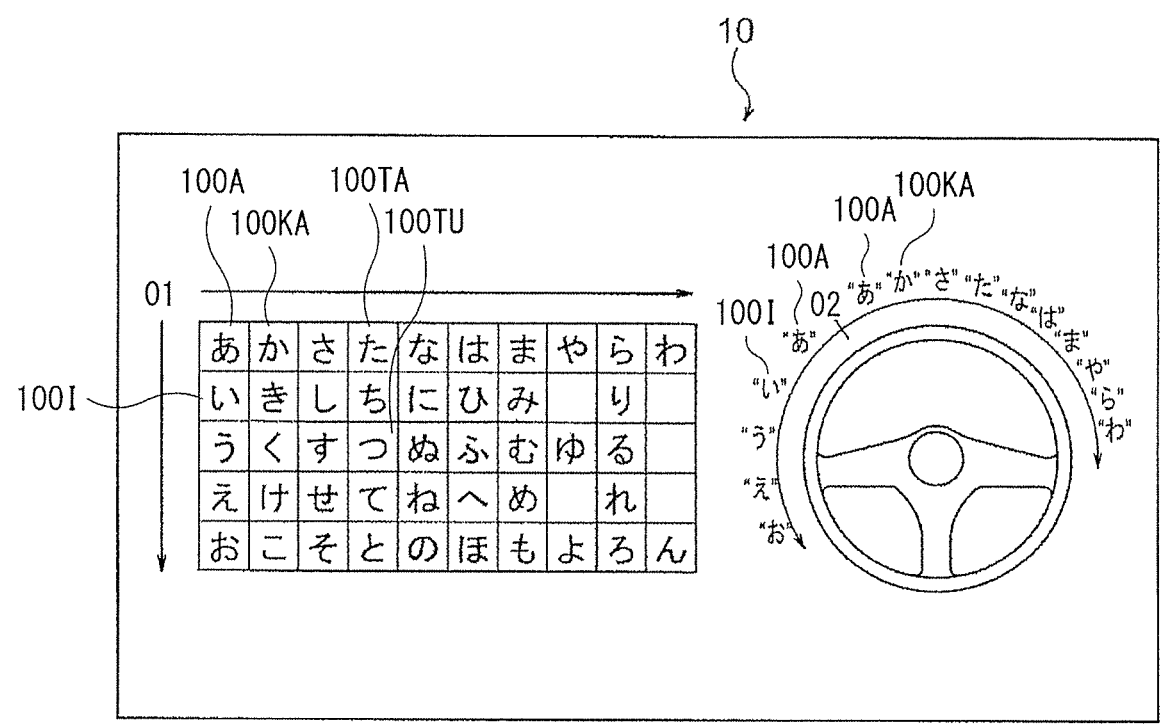
FIG. 5 is a diagram describing an example of displaying performed by a display illustrated in FIG. 4.

FIG. 4 illustrates an example of displaying performed by the display 10 in which only the characters, including the character denoted by 100A, the character denoted by 100I, and so forth, as selection contents to be selected by the driver are displayed. FIG. 5 illustrates another example of displaying performed by the display 10 in which, in addition to the characters as the selection contents to be selected by the driver, a correspondence relationship between selection positions on the steering wheel rim 16 and their corresponding respective selection contents are displayed. According to some implementations, the display contents may be displayed and selected with the origin O1 set to the display 10 and the origin O2 set to the steering wheel rim 16 being associated with each other, with one of the coordinate axes of the display 10 being associated with one of the directions in the circumferential direction of the steering wheel rim 16 from the origin O2, and with the other of the coordinate axes of the display 10 being associated with the other of the directions in the circumferential direction of the steering wheel rim 16 from the origin O2. As described previously, it is possible for the driver to select any content displayed on the display 10 intuitively when the driver is accustomed to such a way of selecting the display content according to some implementations. Some drivers who are not so accustomed to the way of selecting the display content according to some implementations, however, may find it difficult to select the displayed content on the basis of the circumference of the steering wheel rim 16 by means of the steering wheel 14. The example implementation illustrated in FIG. 5 displays, on the display 10, the correspondence relationship between the selection positions on the steering wheel rim 16 and their corresponding respective selection contents, which helps the driver, who is not accustomed to the way of selecting the display content by means of the steering wheel 14, to understand and operate the way of selecting the display content. Note that, in an example implementation, the position of the origin O1 set to the display 10 and the position of the origin O2 set to the steering wheel rim 16 may be changed depending on a content to be displayed on the display 10. Further, in an example implementation, the correspondence relationship between the selection positions on the steering wheel rim 16 and their corresponding respective selection contents may be displayed selectively on the display 10.

According to some implementations described above, the input apparatus for vehicle allows any content displayed on the display 10 to be selected on the basis of the coordinates, i.e., the vertical axis coordinate and the horizontal axis coordinate, that are defined by the two axes including the vertical axis and the horizontal axis set to the display 10. In the input apparatus for vehicle, upon selecting any content displayed on the display 10 on the basis of the coordinates, the origin O1 as the point of origin of the two axes is displayed on the display 10, and the positions at which a finger of one hand of the driver and a finger of the other hand of the driver are in contact or pressed thereby are detected through the touch sensor 18 provided on the steering wheel rim 16 in the circumferential direction of the steering wheel rim 16. Further, in the input apparatus for vehicle, a position of a finger of one hand of the driver corresponds to a coordinate in one of the two axial directions set corresponding to one of the directions, starting from the origin O2, in the circumferential direction of the steering wheel rim 16, and a position of a finger of the other hand of the driver corresponds to a coordinate in the other of the two axial directions set corresponding to the other of the directions, starting from the origin O2, in the circumferential direction of the steering wheel rim 16. The origin O2 is set to the steering wheel rim 16 and corresponds to the origin O1 displayed on the display 10. On the basis of the coordinates defined by the two axes, any content displayed on the display 10 is selected.

Thus, it is possible for the driver to select any content displayed on the display 10 simply by moving the fingers in the circumferential direction of the steering wheel rim 16, eliminating the necessity of releasing a hand from the steering wheel 14. In addition, the coordinates are able to be selected on the basis of the positions of the respective fingers of the both hands of the driver. The coordinates, i.e., the vertical axis coordinate and the horizontal axis coordinate, are defined by the two axes on the display 10 which are set corresponding to the respective two directions starting from the origin O2, i.e., the anticlockwise direction and the clockwise direction, in the circumferential direction of the steering wheel rim 16. The origin O1 displayed on the display 10 and the origin O2 set to the steering wheel rim 16 correspond to each other. Thus, it is possible for the driver to select any content intuitively while predicting, to some extent, the contents displayed on the display 10 and a position on the display 10 at which the selection is made. Hence, it is possible to prevent a situation that involves together a movement of viewpoint to the display 10 and releasing of a hand from the steering wheel 14, and thereby to reduce the time required to perform the continuous movement of viewpoint to the display 10.

Accordingly, it is possible to eliminate the necessity for the driver to perform together the movement of viewpoint and the releasing of a hand from the steering wheel and thereby to reduce the time required for the driver to move his/her viewpoint as much as possible upon making a selection of a content displayed on the display 10.

In an example implementation, the origin O2 may be displayed on the steering wheel rim 16. Hence, it is possible to allow the origin O2 on the steering wheel rim 16 and the origin O1 on the display 10 to correspond to each other easily.

In an example implementation, the origin O2 on the steering wheel rim 16 may be located at a position that is substantially in the same direction as the origin O1 on the display 10, e.g., in the upper left direction. Hence, it is possible for the driver to understand easily which part of the steering wheel rim 16 should be operated to select a desired location on the display 10.

The example implementation where the origin O2 set to the steering wheel rim 16 is displayed on the display 10 helps the driver to understand easily that the driver is able to select any content displayed on the display 10 in accordance with the positions of the respective fingers of the both hands. Hence, it is also possible to further reduce the time required to perform the continuous movement of viewpoint to the display 10.

Although some implementations of the technology have been described in the foregoing with reference to the accompanying drawings, the technology is by no means limited to the implementations described above. Various changes and modifications may be made to any implementation without departing from the scope of the technology. For example, in some implementations described above, the input apparatus for vehicle is directed to the AV navigation in which any content displayed on the display 10 of the AV navigation is selected; however, the input apparatus for vehicle is not limited thereto. The input apparatus for vehicle according to any implementation is applicable to any input apparatus, as long as such an input apparatus is designed to select contents displayed on the coordinates that are defined by the two axes, including the vertical axis and the horizontal axis, of the display 10. Further, in some implementations described above, the display 10 is disposed on the instrument panel; however, the display 10 may be disposed at any location in the vehicle, such as at a steering boss. Further, a displayed content to be selected by the driver may be any content.

In some implementations described above, the controller 12 calculates the vertical axis coordinate that corresponds to the position on the steering wheel rim 16 at which a finger of the driver is in contact or pressed thereby in step S3, and calculates the horizontal axis coordinate that corresponds to the position on the steering wheel rim 16 at which a finger of the driver is in contact or pressed thereby in step S4; however, the order of calculation may be reversed. In an alternative implementation, the controller 12 may calculate the horizontal axis coordinate that corresponds to the position on the steering wheel rim 16 at which a finger of the driver is in contact or pressed thereby in step S3, and may calculate the vertical axis coordinate that corresponds to the position on the steering wheel rim 16 at which a finger of the driver is in contact or pressed thereby in step S4.

The controller 12 illustrated in FIGS. 1 and 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 12. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 12 illustrated in FIGS. 1 and 4.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope defined by the elements recited in the appended claims or the equivalents thereof.

The invention claimed is:

1. An input apparatus for vehicle to be mounted on a vehicle, the vehicle being provided with a display and a steering wheel that includes a steering wheel rim where a second origin is set, the steering wheel being used for driving the vehicle by a driver having a first finger and a second finger different from the first finger, the input apparatus for vehicle comprising:
   a controller; and
   a finger detector provided on the steering wheel rim, and configured to output a detection signal associated with a position of the first finger and a position of the second finger to the controller,
   wherein the controller is configured to:
      display, on the display, 1) a first origin being a point of origin common to a first axial direction and a second axial direction of the display, and 2) a plurality of contents on a plane that is defined by the first axis and the second axis;
      calculate, based on the detection signal, a position of the first finger with respect to the second origin on the steering wheel rim and a position of the second finger with respect to the second origin on the steering wheel rim;
      determine a first position on the first axis of the display based on the position of the first finger with respect to the second origin on the steering wheel rim;
      determine a second position on the second axis based on the position of the second finger with respect to the second origin on the steering wheel rim;
      form a coordinate point of the first position on the first axis and the second position on the second axis; and
      select, based on the formed first point of the first axis and the formed second point of the second axis on the display, a content from the plurality of contents displayed on the display.

2. The input apparatus for vehicle according to claim 1, wherein the controller is further configured to display the second origin on the steering wheel rim.

3. The input apparatus for vehicle according to claim 1, wherein the second origin on the steering wheel rim is located at a position that is substantially in a same direction as the first origin displayed on the display.

4. The input apparatus for vehicle according to claim 2, wherein the second origin on the steering wheel rim is located at a position that is substantially in a same direction as the first origin displayed on the display.

5. The input apparatus for vehicle according to claim 1, wherein the controller is configured to display the second origin on the display.

6. The input apparatus for vehicle according to claim 2, wherein the controller is configured to display the second origin.

7. The input apparatus for vehicle according to claim 3, wherein the controller is configured to display the second origin.

8. The input apparatus for vehicle according to claim 4, wherein the controller is configured to display the second origin.

9. The input apparatus for vehicle according to claim 1,
wherein the steering wheel rim extends along a circumferential direction axis including a first direction and a second direction opposite to the first direction, and includes a first portion extending from the second origin to the first direction and a second portion extending from the second origin to the second direction,
wherein the second origin is set on the circumferential direction axis,
wherein the finger detector is configured to detect the position of the first finger that is positioned on the first portion, and the position of the second finger that is positioned on the second portion, and
wherein the controller is configured to calculate, along the circumferential direction axis, the first position of the first finger with respect to the second origin and the second position of the second finger with respect to the second origin.

10. An input apparatus for vehicle to be mounted on a vehicle, the vehicle being provided with a display and a steering wheel that includes a steering wheel rim where a second origin is set, the steering wheel being used for driving the vehicle by a driver having a first finger and a second finger different from the first finger, the input apparatus for vehicle comprising:
a sensor that is provided on the steering wheel rim, and configured to output a detection signal associated with a position of the first finger and a position of the second finger; and
circuitry configured to:
display, on the display, 1) a first origin being a point of origin common to a first axis and a second axis intersecting with the first axis of the display, and 2) a plurality of contents on a plane that is defined by the first axis and the second axis;
calculate, based on the detection signal, a position of the first finger with respect to the second origin on the steering wheel rim and a position of the second finger with respect to the second origin on the steering wheel rim;
determine a first position on the first axis on the display based on the position of the first finger with respect to the second origin on the steering wheel rim;
determine a second position on the second axis on the display based on the position of the second finger with respect to the second origin on the steering wheel rim;
form a coordinate point of the first position on the first axis and the second position on the second axis; and
select, based on the coordinate point of the first position on the first axis and the second position on the second axis on the display, a content from the plurality of contents displayed on the display.

11. The input apparatus for vehicle according to claim 10,
wherein the steering wheel rim extends along a circumferential direction including a first direction and a second direction opposite to the first direction, and includes a first portion extending from the second origin to the first direction and a second portion extending from the second origin to the second direction,
wherein the second origin is set on the circumferential direction axis,
wherein the sensor is configured to detect the position of the first finger that is positioned on the first portion, and the position of the second finger that is positioned on the second portion, and
wherein the circuitry is configured to calculate, along the circumferential direction axis, the first position of the first finger with respect to the second origin and the second position of the second finger with respect to the second origin.

12. An input apparatus for vehicle to be mounted on a vehicle, the input apparatus for vehicle comprising:
a display;
a steering wheel that includes a steering wheel rim where a second origin is set, the steering wheel being used for driving the vehicle by a driver having a first finger and a second finger different from the first finger;
a controller; and
a finger detector provided on the steering wheel rim, and configured to output a detection signal associated with a position of the first finger and a position of the second finger to the controller,
wherein the controller is configured to:
display, on the display, 1) a first origin being a point of origin common to a first axis and a second axis intersecting with the first axis of the display, and 2) a plurality of contents on a plane that is defined by the first axis and the second axis;
calculate, based on the detection signal, a first position of the first finger and a second position of the second finger in a circumferential direction of the steering wheel; and
select a content from the plurality of contents displayed on the display based on the first position and the second position on the steering wheel rim, and
wherein each of the position of the first finger and the position of the second finger in a circumferential direction of the steering wheel is associated with positions of each of the plurality of contents displayed on the display.

13. The input apparatus for vehicle according to claim 12,
wherein the steering wheel rim extends along a circumferential direction axis including a first direction and a second direction opposite to the first direction, and includes a first portion extending from the second origin to the first direction and a second portion extending from the second origin to the second direction,
wherein the second origin is set on the circumferential direction axis,
wherein the finger detector is configured to detect the position of the first finger that is positioned on the first portion, and the position of the second finger that is positioned on the second portion, and
wherein the controller is configured to calculate, along the circumferential direction axis, the first position of the first finger with respect to the second origin and the second position of the second finger with respect to the second origin.

* * * * *